United States Patent [19]

Held et al.

[11] Patent Number: 5,085,840

[45] Date of Patent: * Feb. 4, 1992

[54] PROCESS FOR THE REDUCTION OF NITROGEN OXIDES CONTAINED IN EXHAUST GASES

[75] Inventors: Wolfgang Held; Axel König, both of Wolfsburg; Lothar Puppe, Burscheid, all of Fed. Rep. of Germany

[73] Assignee: Bayer Aktiengesellschaft, Leverkusen, Fed. Rep. of Germany

[*] Notice: The portion of the term of this patent subsequent to Aug. 7, 2007 has been disclaimed.

[21] Appl. No.: 646,815

[22] Filed: Jan. 28, 1991

[30] Foreign Application Priority Data

Feb. 6, 1990 [DE] Fed. Rep. of Germany ....... 4003515

[51] Int. Cl.$^5$ .......................... B01D 47/00; B01J 8/00; C01B 21/00
[52] U.S. Cl. .................................. 423/212; 423/235; 423/239
[58] Field of Search ............... 423/235, 235 D, 212 R, 423/212 C, 239, 239 A

[56] References Cited

U.S. PATENT DOCUMENTS 4,946,659 8/1990 Held et al. ........................ 423/212

FOREIGN PATENT DOCUMENTS 51-69476 6/1976 Japan ................................. 423/239
1433486 10/1988 U.S.S.R. ............................ 423/239

Primary Examiner—Gregory A. Heller
Attorney, Agent, or Firm—Connolly and Hutz

[57] ABSTRACT

A process for the reduction of nitrogen oxides in flue gases and engine exhaust gases is improved by contacting the gases with a zeolite catalyst containing oxides of the transition elements from Periods 4, 5 and 6 of the Periodic Table of Elements or oxides of the rare earths. In particular, faujasite zeolites, mordenites and $SiO_2$-rich zeolites are preferred.

4 Claims, 1 Drawing Sheet

PROCESS FOR THE REDUCTION OF NITROGEN OXIDES CONTAINED IN EXHAUST GASES

The invention relates to a process for the reduction of nitrogen oxides contained in exhaust gases, especially of internal combustion engines, by means of a zeolite-containing catalyst.

BACKGROUND OF THE INVENTION

A process and an apparatus for removing nitrogen oxides from gases are known from DE-OS 3,642,018. As specified in detail there, the zeolite catalyst, which can be formed as a monolithic catalyst or as a bulk material catalyst, can preferably contain zeolites of types X, Y or mordenite. The mode of operation of this known process is based on the fact that the nitrogen oxides contained in the exhaust gases, for example of a motor vehicle internal combustion engine, can be reacted with the hydrocarbons also normally present in the exhaust gases, as reducing agents, and the oxygen present during the combustion of a lean fuel-air mixture. With that the known addition of ammonia as reducing agent, which is problematic for several reasons, especially in motor vehicles, can be dispensed with.

A precondition for the described operation of the known process is consequently a definite minimum value of the hydrocarbon concentration in the exhaust gas, since these, as described, serve as reducing agents. Accordingly the known process cannot be used, at least optimally, in the cases in which, as with diesel engines or Otto engines with direct gasoline injection, the hydrocarbon concentration in the exhaust gas is definitely less than the nitrogen oxide concentration.

In German application P 3,830,045.1 this problem is solved by adding urea to the exhaust gas stream containing oxygen in excess, whereby the addition and storage of problematic reducing agents such as ammonia is avoided.

In the course of this, urea reduces the nitrogen oxides in an exhaust gas stream containing oxygen in excess on a catalyst. This is no doubt based on the fact that urea ($H_2N-CO-NH_2$) hydrolyzes easily to $CO_2$ and 2 $NH_3$ or decomposes with formation of $NH_2$ radicals.

In the final analysis, urea is thus a reservoir for a reducing agent. It is true that for treating the exhaust gases emitted by a motor vehicle internal combustion engine, for example, the reducing agent must be brought along too in a tank fastened to the vehicle, but it exists in unproblematic form in the shape of aqueous urea solution, and the reducing agent is only formed later.

The metering of the reducing agent can be carried out by dosing 50% to 200% of the theoretically required amount, preferably 80% to 100% of the required amount.

On a Cu-exchanged zeolite of the ZSM type (ZSM-5) the following $NO_x$ reduction, for example, was achieved with urea:

TABLE 1

| $NO_x$: urea | 1:0.25 | 1:0.41 | 1:0.52 | 1:0.83 |
|---|---|---|---|---|
| $NO_x$: conversion % | 50% | 74% | 83% | 99% |

The addition of reducing agent will accordingly be controlled or adjusted according to the mode of operation or operating quantities of the apparatus producing the exhaust gas, thus for example a vehicle internal combustion engine. For example with a vehicle internal combustion engine there is when driving a definite nitrogen oxide concentration in the exhaust gas as a function of the operating point of the machine at the moment, which is defined for example by engine speed and load, and the control or adjustment of the addition of reducing agent is carried out so that the exhaust gas after the zeolitic catalyst in the direction of flow contains the lowest possible proportions of reducing agent and nitrogen oxides. In the exemplary test it is assumed that one mole urea forms two moles of a reducing agent. The dosage of urea was so chosen that about 90% of the theoretically required amount of reducing agent was available. The space velocity was so chosen that 12,900 $h^{-1}$ was reached. However, at low exhaust gas temperatures, such as are common in the start-up phase with diesel engines, the Cu-containing zeolitic catalysts claimed in the prior application reach only small conversion rates. But it is desirable to achieve as high as possible a conversion immediately in the start-up phase.

BRIEF DESCRIPTION OF THE INVENTION

It has now been discovered that an improvement in removal of nitrogen oxides from gas mixtures (especially engine exhaust gases at start-up temperatures) can be achieved by contacting the gas mixtures with a zeolite catalyst containing oxides of the transition elements of Periods 4, 5 and 6 of the Periodic Table of Elements or oxides of the rare earth elements.

DETAILED DESCRIPTION

Figure 1:
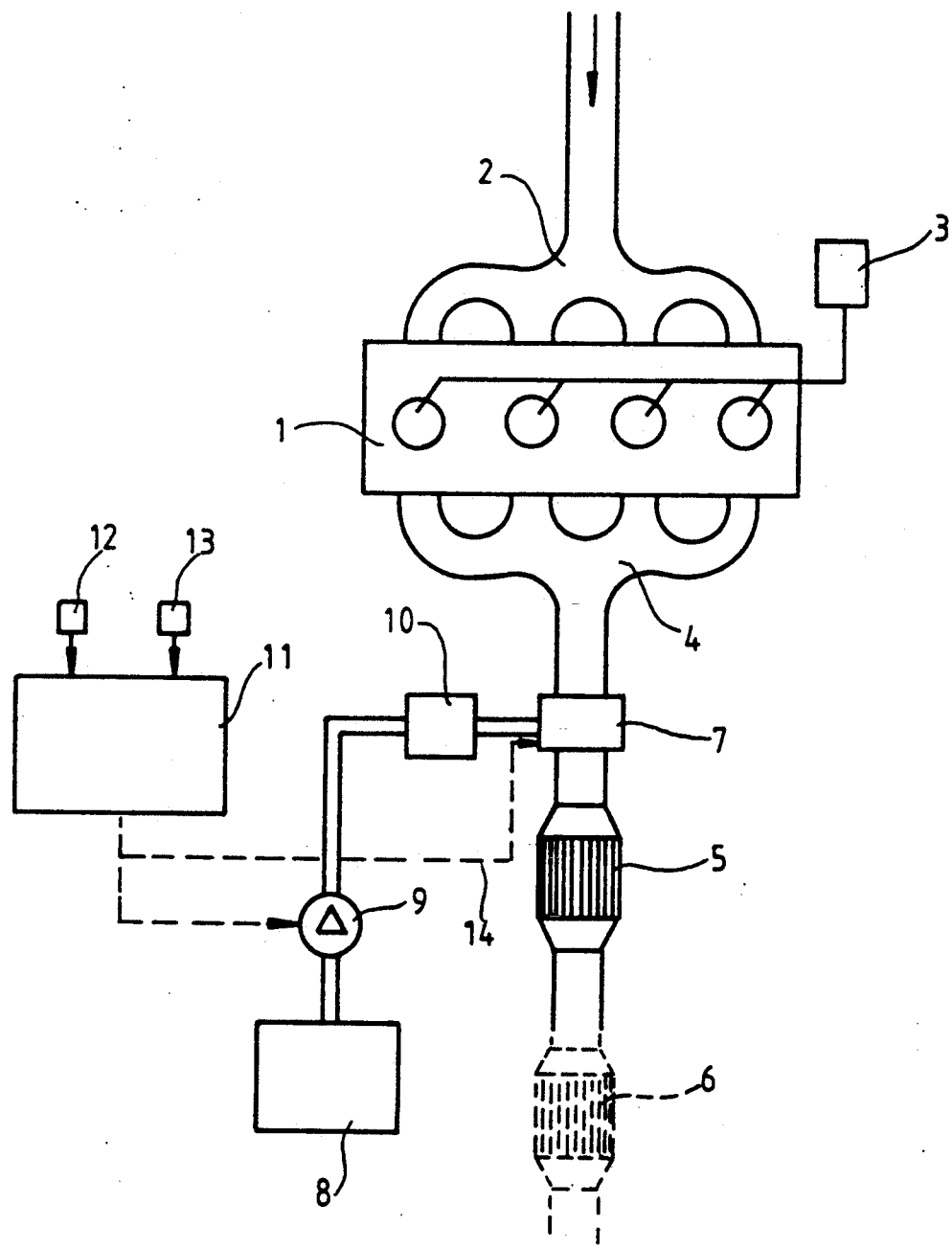
FIG. 1 illustrates an engine and ancillary apparatus for carrying out the process of this invention.

An important criterion for the assessment of a catalyst is the initiation temperature. It has now been found that oxidic additives to the Cu-exchanged zeolite catalyst, for example, promote the desired properties of the catalyst. Subject matter of the present invention includes a process for the reduction of nitrogen oxides contained in flue gases and exhaust gases, especially of internal combustion engines, under oxidizing conditions by means of a zeolite catalyst which can optionally contain exchanged metal ions, and with a reducing agent, which is characterized in that a zeolitic catalyst containing oxides of the transition elements of periods 4, 5 and 6 and/or oxides of the rare earths is used. Groups IIIb to VIII as well as Ib and IIb are preferred.

Table 2 shows the increase of the NO conversion rate by oxidic additives, such as e.g. $TiO_2$, $V_2O_5$, $WO_3$ or $CuCr_2O_4$ at low temperature.

For the process according to the invention, suitable oxidic additives are for example: $TiO_2$, $V_2O_5$, $Cr_2O_3$, $MnO_2$, $Fe_2O_3$, $CoO$, $NiO$, $CuO$, $Y_2O_3$, $ZrO_2$, $Nb_2O_5$, $MoO_3$, $La_2O_3$ $Ce_2O_3$, $WO_3$.

Also suitable are corresponding mixtures of the oxides. The mixtures can contain two or more oxidic components.

The oxides are used in amounts of 0.1 to 20 wt. % relative to the zeolite/binder combination, preferably 0.5 to 10 wt. %.

Especially suitable oxidic additives are $TiO_2$, $V_2O_5$, $WO_3$, $MoO_3$, $CuCr_2O_4$, $La_2O_3$ and $Ce_2O_3$.

The oxidic additives are usually added to the zeolite/binder combination, and the mixture homogenized by intensive grinding, for example with agitating ball mills. Then the mixtures are made granulation-moist by drying and pressed with suitable units, e.g. drum granulators or extruders, to mouldings. The coating of monolithic supports with a suspension of the active components can also be carried out.

An outstanding characteristic of the discovered catalyst formulation is that the catalyst achieves over 70% NO conversion at temperatures below 400° C., even in the region of 200° C.

The catalyst described is characterized by being active over a wide temperature range and reaching its activity at a lower temperature than non-catalytic processes, which operate at 800° C. to over 1000° C.

The experiments shown in Table 2 were carried out at a space velocity of 12,900 h$^{-1}$. This is distinctly higher than the space velocity of about 6,000 to 10,000 h$^{-1}$ which is otherwise usual in selective catalytic reduction (SCR) processes.

A further increase of the space velocity does not lead to a proportional deterioration of the NO conversion rate, as is shown for example in Table 3 on a Cu-exchanged zeolite catalyst.

TABLE 3

| Temperature °C. | % NO conversion at | | |
|---|---|---|---|
| | 12,900 h$^{-1}$ | 19,700 h$^{-1}$ | 39,500 h$^{-1}$ |
| 150 | 6 | 3 | 3 |
| 200 | 47 | 31 | 22 |
| 250 | 94 | 77 | 56 |
| 300 | 97 | 89 | 88 |
| 350 | 100 | 89 | 92 |
| 400 | 91 | 89 | 88 |

TABLE 2

| Temperature | NO$_x$ conversion (%) | | | | |
|---|---|---|---|---|---|
| | CuHZSM5 | CuHZSM5 2% TiO$_2$ | CuHZSM5 1% V$_2$O$_5$ | CuHZSM5 2% WO$_3$ | CuHZSM5 2% CuCr$_2$O$_4$ |
| 150° C. | 6 | 0 | 0 | 6 | 6 |
| 200° C. | 47 | 57 | 53 | 70 | 73 |
| 250° C. | 94 | 97 | 94 | 97 | 97 |
| 300° C. | 97 | 100 | 97 | 98 | 98 |
| 350° C. | 100 | 100 | 97 | 100 | 100 |
| 400° C. | 91 | 100 | 91 | 91 | 88 |

The invention is explained below with the aid of FIG. 1, which shows an exemplary embodiment for an apparatus for carrying out the process according to the invention on a vehicle internal combustion engine.

In the exemplary embodiment shown there is a diesel internal combustion engine 1 with intake line 2, fuel supply 3 and exhaust gas system 4. From this, the exhaust gases reach the zeolitic catalyst 5, which can have a composition known in detail from the initially mentioned DE-OS 3 642 018 or a corresponding composition, and from this they can arrive at the oxidation catalyst 6, which, however, can also be omitted.

This is possible if the zeolite catalyst is so designed that it can also operate as an oxidation catalyst. A further possibility is to arrange the oxidation catalyst before the zeolite catalyst.

Before the zeolite catalyst 5 in the flow direction is the addition device 7 for a reducing agent containing urea or consisting entirely of urea. This is stored in liquid form in the tank 8 and fed to the addition device via a feed arrangement. The feed arrangement can be a pump or elevated pressure in the stock tank (8).

The heating device 10 has a construction known as such; it can for example contain as essential component a heater plug or an electrically heated hedgehog. When the engine is warm, the decomposition of the urea is carried out by the hot exhaust gas.

The feed rate is so controlled or adjusted that the amount of reducing agent required for the reduction of the amount of nitrogen oxide present in the exhaust gas at the time concerned is fed to the exhaust gas at 7. The nitrogen oxide content of the exhaust gas depends on the mode of operation of the internal combustion engine 1 at the time concerned, the operating point at the time concerned being definable by the values of speed and load of the engine 1 at the time concerned. Accordingly the pump is controlled or adjusted with regard to its feed rate via a performance characteristics store 11, to which are supplied signals from an engine speed sensor 12 and a load sensor 13 of the engine 1, and in which are stored the values of the nitrogen oxide content of the exhaust gas of the engine 1, corresponding to the various engine speed and load values. The store 11 then delivers the drive signals corresponding to the nitrogen oxide content at the time concerned to the pump 9.

As indicated by the line 14, instead of the pump the device 7, in the form for example of an electromagnetic injection valve, can be driven correspondingly.

By means of the invention, therefore, a possibility is provided for the reduction of nitrogen oxides contained in exhaust gases, while avoiding problematic reducing agents, on a zeolite-containing catalyst even at low hydrocarbon content of the exhaust gases.

What is claimed is:

1. In an improved process for the reduction of nitrogen oxides in engine exhaust gases under oxidizing conditions by contacting the gases with urea and a zeolite catalyst, the improvement comprises contacting the gases with a zeolitic catalyst containing 0.1 to 20% by weight of oxides of the transition elements of Periods 4, 5 and 6 of the Periodic Table of Elements or oxides of the rare earths.

2. The process according to claim 1 wherein said oxides are at least one of TiO$_2$, V$_2$O$_5$, Cr$_2$O$_3$, MnO$_2$, Fe$_2$O$_3$, CoO, NiO, CuO, Y$_2$O$_3$, ZrO$_2$, Nb$_2$O$_5$, MoO$_3$, La$_2$O$_3$, Ce$_2$O$_3$ or WO$_3$.

3. The process according to claim 1 wherein the gases are internal combustion engine exhaust gases.

4. The process according to claim 3 wherein the amount of urea is in relation to speed and load values of the engine producing the gases treated whereby at any given time approximately the amount of the urea required for complete reduction of the nitrogen oxides is added.

* * * * *